United States Patent
Kumar

(10) Patent No.: US 9,563,581 B1
(45) Date of Patent: Feb. 7, 2017

(54) REMOTE-SESSION KEYBOARD AND MOUSE INPUT VIA GENERIC DEVICE REDIRECTION

(71) Applicant: Citrix Systems, Inc., Fort Lauderdale, FL (US)

(72) Inventor: Sandeep Kumar, Cupertino, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 14/950,400

(22) Filed: Nov. 24, 2015

(51) Int. Cl.
| | |
|---|---|
| *G06F 13/10* | (2006.01) |
| *G06F 13/40* | (2006.01) |
| *G06F 13/20* | (2006.01) |
| *G06F 13/42* | (2006.01) |
| *G06F 3/06* | (2006.01) |

(52) U.S. Cl.
CPC ............ *G06F 13/102* (2013.01); *G06F 13/20* (2013.01); *G06F 13/4068* (2013.01); *G06F 13/4282* (2013.01)

(58) Field of Classification Search
None
See application file for complete search history.

(56) References Cited

U.S. PATENT DOCUMENTS

| | | | | |
|---|---|---|---|---|
| 2010/0268828 A1* | 10/2010 | Pahlavan | ............. | G06F 9/4445 709/227 |
| 2013/0166629 A1* | 6/2013 | Ivashin | .................. | H04L 63/10 709/203 |

* cited by examiner

*Primary Examiner* — Scott Sun
(74) *Attorney, Agent, or Firm* — BainwoodHuang

(57) ABSTRACT

A hosting computer accepts specialized keyboard and mouse input via a generic device redirection channel from a client computer. A device manager has interfaces to the generic device redirection channel and to a system queue for communicating keyboard and mouse input events to an operating system. The system queue has a separate interface to a virtual channel for receiving redirected keyboard and mouse input from standard keyboard and mouse devices. The device manager identifies keyboard and mouse functions of other devices connected to the client computer and having device input redirected to the hosting computer via the generic device redirection channel, and establishes respective device context engines for handling input events from the identified functions. The device context engines open the keyboard and mouse functions, and upon receiving input events from functions, queues the input events on the system queue to communicate them to the operating system.

20 Claims, 4 Drawing Sheets

REMOTE-SESSION KEYBOARD AND MOUSE INPUT VIA GENERIC DEVICE REDIRECTION

BACKGROUND

The invention is related to the field of virtualized computing, and in particular to redirection of local device input to a guest operating system of a virtual computing platform or hosting system.

SUMMARY

Operating systems deployed as guest operating systems in virtual computing platforms are in some cases designed to recognize and support only those client-connected keyboard and mouse devices connected to the session at connection time. They may not recognize keyboard and mouse devices that are redirected through other redirection technologies such as generic Universal Serial Bus (USB) redirection or human interface device (HID) redirection. This limitation can adversely affect evolving virtual-computing use cases in which composite or specialty devices are used that have multiple functions that may include keyboard or mouse functionality. While the input from such devices can be redirected in remote session, the input cannot actually be used by the guest operating system. Examples of such devices include a credit card reader presenting a key pad as a keyboard device, and a drawing tablet with multi-functions like pen, touch and mouse. In both cases, the device input that is redirected via generic redirection is not recognized as keyboard or mouse input, effectively preventing desired full use of the devices.

A method is disclosed of operating a hosting computer to accept specialized keyboard and mouse input via a generic device redirection channel from a client computer. The method may be employed in conjunction with a guest operating system that may not otherwise be capable of accepting such input, as described above. Thus, the method may be deployed even in products or environments in which it is not possible (for business or technical reasons) to modify the guest operating system to accept such input directly from a generic device redirection channel.

In one aspect the method includes executing a device manager having respective interfaces to the generic device redirection channel and to a system queue of the hosting computer, where the system queue is used to communicate keyboard and mouse input events to an operating system of the hosting computer. The system queue also has a separate interface to a specialized virtual channel for receiving redirected keyboard and mouse input from standard keyboard and mouse devices connected to the client computer.

The method further includes, by the device manager, identifying keyboard and mouse functions of other devices connected to the client computer and having respective device input redirected to the hosting computer via the generic device redirection channel, and for the identified keyboard and mouse functions establishing respective device context engines for handling input events therefrom.

The method further includes, by the device context engines, opening the respective keyboard and mouse functions of the respective other devices for receiving keyboard and mouse input events therefrom, and upon receiving input events from the respective keyboard and mouse functions, queueing the input events on the system queue to communicate the keyboard and mouse input events to the operating system.

The device manager with device context engines provides a path from the generic device redirection channel to the system queue used by the virtual channel to provide keyboard and mouse input to the operating system. Thus the operating system receives such input via a native mechanism capable of recognizing and correctly processing the input.

In one detailed aspect, the operating system may lack native support for correctly processing keyboard/mouse input received directly from the generic device redirection channel without operation of the device manager.

In another detailed aspect, the hosting system includes a virtual machine executing the operating system as a guest operating system. The virtual machine may provide a multi-user/multi-session platform interacting with multiple clients, with a requirement that the other devices of separate clients be logically isolated from each other.

In another detailed aspect, the other devices include one or more of a card reader and a tablet device, the card reader having a key pad presented as a keyboard device, the tablet device having multiple functions including stylus or touch input as well as mouse input.

In another detailed aspect, the other devices are Universal Serial Bus devices and the generic device redirection channel is a Universal Serial Bus device redirection channel.

In another detailed aspect, a preceding device enumeration and context setup is performed during an initialization phase of operation, with the device manager (a) enumerating all keyboard and mouse devices of connected clients, (b) for the standard devices, starting a plug-and-play monitor to await device arrival and to incorporate the standard devices into the system upon arrival, and (c) for the other devices, starting the device context engines.

In another detailed aspect, the device context engines are operative to self-shutdown upon device removal as well as upon session disconnection.

Also disclosed is a non-transitory computer-readable medium storing computer program instructions, the instructions being executable by a computer to cause the computer to perform a method of accepting specialized keyboard and mouse input via a generic device redirection channel from a client computer, the method being substantially as described above.

Also disclosed is a hosting computer having one or more processors, input/output circuitry coupled to the processors and operative to couple the hosting computer to a client computer, and memory coupled to the processors and the input/output circuitry, the memory being operative to store computer program instructions and provide them to the processors for execution, the instructions when executed causing the hosting computer to perform a method of accepting specialized keyboard and mouse input via a generic device redirection channel from the client computer, the method being substantially as described above.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
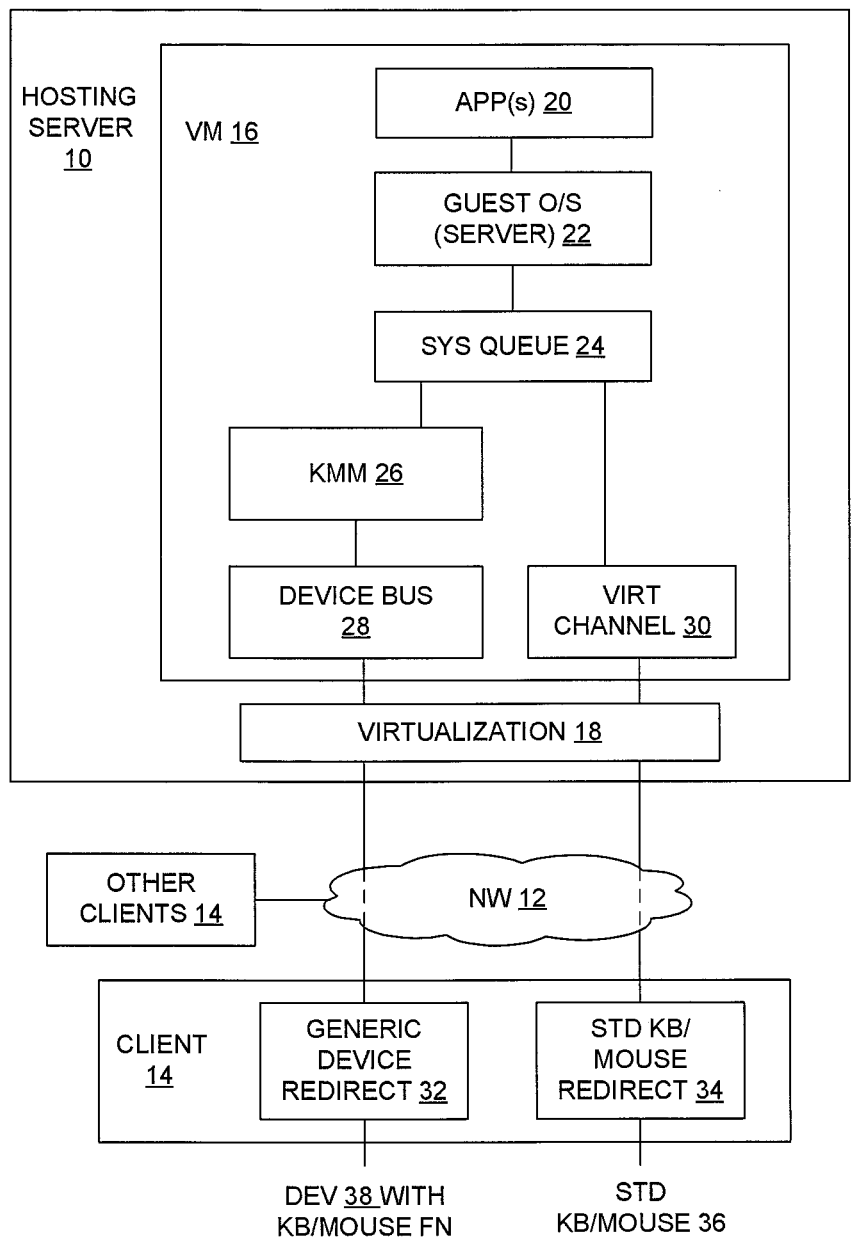
FIG. 1 is a block diagram of a computer system.

FIG. 1 shows a computer system including a hosting server 10, network 12, and client computers or "clients" 14. The system is configured for virtualized computing in which the hosting server 10 provides computing services using one or more virtual machines (VMs) 16 along with virtualization software 18 such as a hypervisor. As generally known, a VM 16 is a software construct that mimics a physical computer. VM-based computing can provide advantages such as modularity, resource efficiency, and dynamic deployment for adapting to changing workloads, hardware outages or malfunctions, etc. The VM 16 is shown as including one or more applications (APPs) 20, an operating system referred to as a "guest" operating system (GUEST O/S) 22, a certain system queue (SYS QUEUE) 24 described more below, a device manager referred to as a keyboard and mouse manager (KMM) 26, a device bus 28 and a virtual channel 30. The guest O/S 22 is a "server" type of operating system typically deployed on server-type machines. An example is the Windows Server® operating system.

A client 14 includes a generic device redirection (redirect) function 32 and a standard keyboard/mouse (STD KB/MOUSE) redirection function 34. The standard keyboard/mouse redirection function 34 provides for redirecting keyboard/mouse input events from a local standard keyboard and/or mouse (STD KB/MOUSE) 36 to the guest O/S 22 of VM 16 via the network 12 and virtual channel 30. The generic device redirection function 34 provides for redirecting input events from other connected devices to the guest O/S 22 of the VM 16 via the network 12 and device bus 28. Specifically, the connected devices in this case are devices 38 that are not standard keyboard or mouse devices but that have keyboard and/or mouse functionality. Examples of such devices include a credit card reader having a key pad which is presented as a 'Keyboard' device. Another example is a touch-sensitive pad or tablet with multiple functions such as pen, touch input, and mouse.

The system queue 24 in this case is dedicated to use in connection with user device input events, i.e., keyboard input events (keystrokes) and mouse input events (panning movement, button clicks, scrolling), both from "standard" keyboard/mouse devices. Here "standard" signifies a primary identification of a device. A standard keyboard is a device providing exclusively or primarily full-keyboard functionality, i.e., QWERTY keys, function keys, numeric keypad if applicable, etc. A standard mouse is a device providing exclusively or primarily mouse functionality, e.g., an optical, two-button mouse. Because such devices are essential for user interaction with the operating system 22, a specialized virtual channel 30 is defined and used for receiving their input events and forwarding them to the system queue 24. While the virtual channel 30 readily handles input from standard keyboard/mouse devices 36, it is not designed for handling generic device input, e.g., input from a USB mass storage device, joystick, microphone, etc., all of which have different input characteristics and typically require specialized device drivers.

Thus at the client 14, it is necessary to use the generic device redirection function 32 in order to redirection input events from the other devices 38 to the hosting server 10. In one example, the devices 38 may be USB® devices (i.e., devices having a USB-compliant interface that can be connected to a USB port of the client computer 14), and the generic device redirection function 32 is so-called generic USB redirection. Other generic redirection technologies are known. Unfortunately, within some hosting servers 10 the VMs 16 may not have native support for receiving keyboard/mouse input via a generic device redirection channel (which in this case corresponds to the connection through the network 12 and the device bus 28). In one example this is a limitation of the Windows Server® operating system deployed as the guest O/S 22. Thus the keyboard and/or mouse function of the devices 38 would not be recognized simply through use of generic device redirection as currently known in the art. However, through use of the KMM 26 and related functionality as described further herein, the keyboard and/or mouse function of devices 38 can be recognized and utilized by the guest O/S 22.

One aspect of the system of FIG. 1 is that the VM 16 is a multi-user/multi-session platform interacting with multiple clients 14, with a requirement that the devices 36, 38 of separate clients 14 be logically isolated from each other. In other configurations in which a VM 16 interacts with only one client 14, there may be other mechanisms that can be used to recognize keyboard and mouse input from devices 38 connected via generic device redirection 32. But there is no provision for associating such keyboard/mouse input with separate clients 14. As explained more below, the presently disclosed technique establishes per-device context that accomplishes such association of keyboard/mouse input with respective clients 14.

More specifically, a Windows Server supports keyboard/mouse input through a virtual channel interface which connects to the keyboard and mouse on the client 14. The server is not designed to accept keyboard/mouse input from a generic device when in remote session. The presently disclosed technique effectively removes this limitation. Theoretically this limitation could be removed in other ways, such as by redesigning the remote-session aspect of Windows Server. Because such a solution may not be possible for any of a variety of reasons (either technical or business), the presently disclosed technique instead adds the KMM 26 as an add-on to provide the desired functionality.

Figure 2:
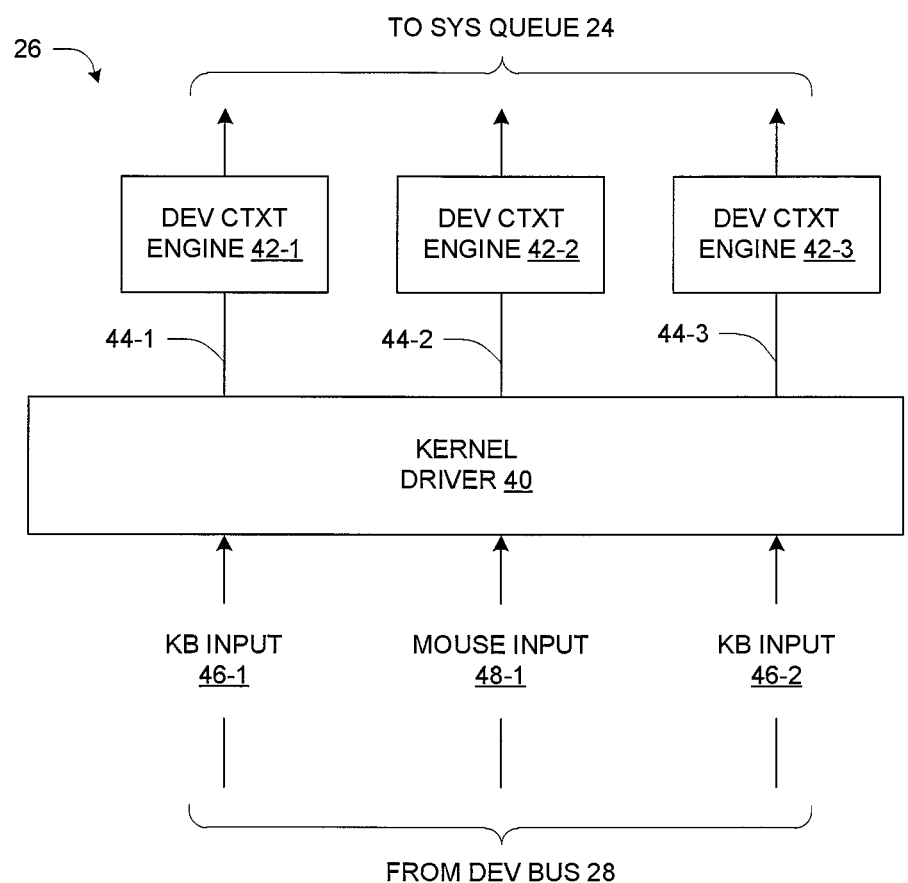
FIG. 2 is a block diagram of a keyboard/mouse manager component.

FIG. 2 shows structure of the KMM 26. It includes a kernel driver 40 and a set of device context engines (DEV CTXT ENGINE) 42, each connected to the kernel driver 40 by a respective "back channel" 44. In operation, the kernel driver 40 receives keyboard/mouse inputs 46, 48 of devices 38 via the device bus 28 (FIG. 1) and provides the inputs to the respective context engines 42, which are responsible for adding the input events to the system queue 24 to communicate them to the guest O/S 22 (FIG. 1).

Figure 3:
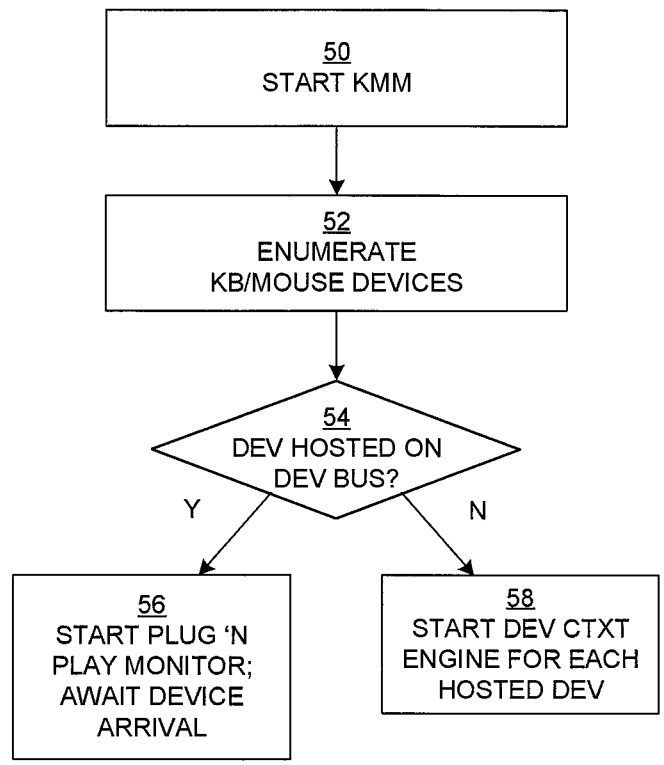
FIGS. 3 and 4 are flow diagrams of operations.

FIG. 3 illustrates an initial part of operation referred to as "device enumeration and context setup." These may be performed during initialization of the VM 16 for example. At 50, the KMM 26 is started. At 52, the KMM 26 enumerates all keyboard and mouse devices of connected clients 14, either standard devices 36 or devices 38 having keyboard or mouse functionality as described above. Step 54 represents a division between those devices hosted on the device bus 28 (i.e., devices 38 with keyboard/mouse functionality) and those devices connected by the virtual channel 30 (i.e., standard keyboard/mouse devices 36). For the latter, at 56 a plug-and-play monitor is started to await device arrival and to incorporate the device into the system upon its arrival. For the devices 38 hosted on the device bus 28, at 58 a device context engine 42 is started for each such hosted device 38.

Below are additional details on the operations of FIG. 3:
1. It is necessary to categorize a device 38 that is redirected via generic device redirection 32 to differentiate it from the standard keyboard/mouse devices 36 present in the session during connection time. Thus, the devices 38 are categorized or tagged with a special property type such as CTX_EXT_DEVICE_KEYBOARD and CTX_EXT_DEVICE_MOUSE. There are various methods to categorize the device including setting a special property in device or parsing the device topology leading to its association with a particular root bus.
2. The KMM 26 includes a user mode consumer service that prepares a list of keyboard and mouse devices 38 by enumerating devices with these tags only. On session connect, KMM 26 runs inside the session. This service enumerates all the keyboard and mouse devices inside the session and prepares a list of keyboard and mouse devices 38 redirected by the generic device redirection 32. KMM 26 has plug-and-play capability to detect surprise device removal and to support hot plugin.
3. The KMM 26 creates a device context engine 42 for each device up to some maximum number N (which may be configurable) for each category (keyboard and mouse). Each device context engine 42 sets itself up to receive the input from device and to process the input to the system queue 24. The device context engines 42 are able to self-shutdown on sudden device removal as well as on session disconnection.

Figure 4:
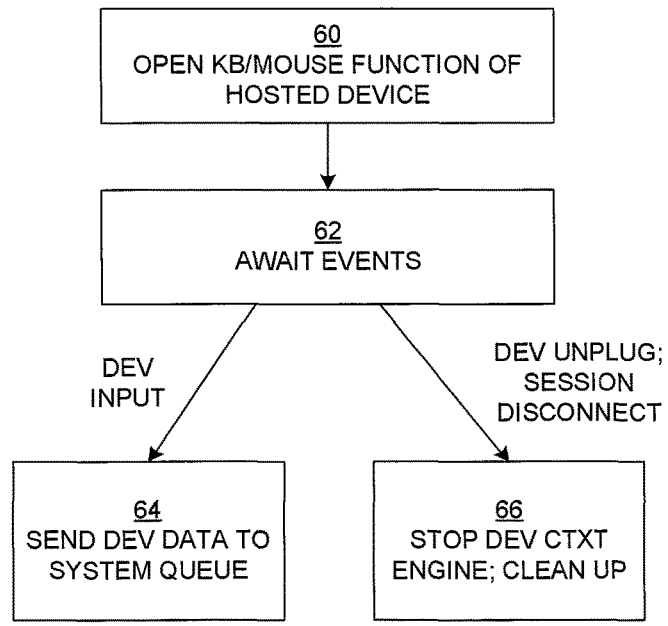

FIG. 4 illustrates operation of the KMM 26 in connection with input events received via the device bus 28. Step 60 is an initialization step of "opening", or enabling operation of, the keyboard/mouse function of each hosted device 38. At 62, input events are awaited. These are separated into two categories, regular device input (e.g., button presses, mouse movements, etc.), and device unplug/disconnect events. Regular device input is processed at 64, which involves forwarding the input event data to the system queue 24 for eventual recognition and processing by the guest O/S 22. The unplug/disconnect events are processed at 66, which includes stopping the device context engine 42 and cleaning up any related operational data that is no longer needed.

Figure 5:
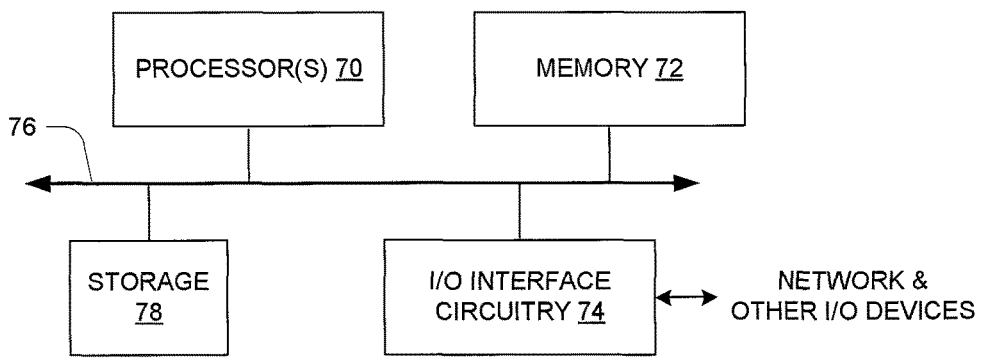
FIG. 5 is a block diagram of a computer from a hardware perspective.

FIG. 5 shows an example configuration of a physical computer such as a hosting server 10 or client 14 from a computer hardware perspective. The hardware includes one or more processors 70, memory 72, and interface circuitry 74 interconnected by data interconnections 76 such as one or more high-speed data buses. The interface circuitry 74 provides a hardware connection to the network 12 (FIG. 1) and perhaps other external devices/connections (EXT DEVs). The processor(s) 70 with connected memory 72 may also be referred to as "processing circuitry" herein. There may also be local storage 78 such as a local-attached disk drive or Flash drive. In operation, the memory 72 stores data and instructions of system software (e.g., operating system) and one or more application programs which are executed by the processor(s) 70 to cause the hardware to function in a software-defined manner. Thus the computer hardware executing instructions of a keyboard/mouse manager application, for example, can be referred to as a keyboard/mouse manager circuit or keyboard/mouse manager component, and it will be understood that a collection of such circuits or components can all be realized and interact with each other as one or more sets of computer processing hardware executing different computer programs as generally known in the art. Further, the application software may be stored on a non-transitory computer-readable medium such as an optical or magnetic disk, Flash memory or other non-volatile semiconductor memory, etc., from which it is retrieved for execution by the processing circuitry, as also generally known in the art.

While various embodiments of the invention have been particularly shown and described, it will be understood by those skilled in the art that various changes in form and details may be made therein without departing from the spirit and scope of the invention as defined by the appended claims.

What is claimed is:

1. A method of operating a hosting computer to accept specialized keyboard and mouse input via a generic device redirection channel from a client computer, comprising:
   executing a device manager having respective interfaces to the generic device redirection channel and to a system queue of the hosting computer, the system queue being used to communicate keyboard and mouse input events to an operating system of the hosting computer, the system queue having a separate interface to a specialized virtual channel for receiving redirected keyboard and mouse input from standard keyboard and mouse devices connected to the client computer;
   by the device manager, identifying keyboard and mouse functions of other devices connected to the client computer and having respective device input redirected to the hosting computer via the generic device redirection channel, and for the identified keyboard and mouse functions establishing respective device context engines for handling input events therefrom; and
   by the device context engines:
      opening the respective keyboard and mouse functions of the respective other devices for receiving keyboard and mouse input events therefrom; and
      upon receiving input events from the respective keyboard and mouse functions, queueing the input events on the system queue to communicate the keyboard and mouse input events to the operating system.

2. The method of claim 1, wherein the operating system lacks native support for correctly processing keyboard/mouse input received directly from the generic device redirection channel without operation of the device manager.

3. The method of claim 1, wherein the hosting system includes a virtual machine executing the operating system as a guest operating system.

4. The method of claim 3, wherein the virtual machine provides a multi-user/multi-session platform interacting with multiple clients, with a requirement that the other devices of separate clients be logically isolated from each other.

5. The method of claim 1, wherein the other devices include one or more of a card reader and a tablet device, the card reader having a key pad presented as a keyboard device, the tablet device having multiple functions including stylus or touch input as well as mouse input.

6. The method of claim 1, wherein the other devices are Universal Serial Bus devices and the generic device redirection channel is a Universal Serial Bus device redirection channel.

7. The method of claim 1, further including a preceding device enumeration and context setup performed during an initialization phase of operation, wherein the device manager:
   enumerates all keyboard and mouse devices of connected clients;

for the standard devices, starting a plug-and-play monitor to await device arrival and to incorporate the standard devices into the system upon arrival; and for the other devices, starting the device context engines.

8. The method of claim 1, wherein the device context engines are operative to self-shutdown upon device removal as well as upon session disconnection.

9. A non-transitory computer-readable medium storing computer program instructions, the instructions being executable by a computer to cause the computer to perform a method of accepting specialized keyboard and mouse input via a generic device redirection channel from a client computer, the method comprising:

executing a device manager having respective interfaces to the generic device redirection channel and to a system queue of the hosting computer, the system queue being used to communicate keyboard and mouse input events to an operating system of the hosting computer, the system queue having a separate interface to a specialized virtual channel for receiving redirected keyboard and mouse input from standard keyboard and mouse devices connected to the client computer;

by the device manager, identifying keyboard and mouse functions of other devices connected to the client computer and having respective device input redirected to the hosting computer via the generic device redirection channel, and for the identified keyboard and mouse functions establishing respective device context engines for handling input events therefrom; and by the device context engines:
opening the respective keyboard and mouse functions of the respective other devices for receiving keyboard and mouse input events therefrom; and upon receiving input events from the respective keyboard and mouse functions, queueing the input events on the system queue to communicate the keyboard and mouse input events to the operating system.

10. The non-transitory computer-readable medium of claim 9, wherein the operating system lacks native support for correctly processing keyboard/mouse input received directly from the generic device redirection channel without operation of the device manager.

11. The non-transitory computer-readable medium of claim 9, wherein the hosting system includes a virtual machine executing the operating system as a guest operating system.

12. The non-transitory computer-readable medium of claim 11, wherein the virtual machine provides a multi-user/multi-session platform interacting with multiple clients, with a requirement that the other devices of separate clients be logically isolated from each other.

13. The non-transitory computer-readable medium of claim 9, wherein the other devices include one or more of a card reader and a tablet device, the card reader having a key pad presented as a keyboard device, the tablet device having multiple functions including stylus or touch input as well as mouse input.

14. The non-transitory computer-readable medium of claim 9, wherein the other devices are Universal Serial Bus devices and the generic device redirection channel is a Universal Serial Bus device redirection channel.

15. The non-transitory computer-readable medium of claim 9, further including a preceding device enumeration and context setup performed during an initialization phase of operation, wherein the device manager:

enumerates all keyboard and mouse devices of connected clients;

for the standard devices, starting a plug-and-play monitor to await device arrival and to incorporate the standard devices into the system upon arrival; and for the other devices, starting the device context engines.

16. The non-transitory computer-readable medium of claim 9, wherein the device context engines are operative to self-shutdown upon device removal as well as upon session disconnection.

17. A hosting computer, comprising:

one or more processors;

input/output circuitry coupled to the processors and operative to couple the hosting computer to a client computer; and memory coupled to the processors and the input/output circuitry, the memory being operative to store computer program instructions and provide them to the processors for execution, the instructions when executed causing the hosting computer to perform a method of accepting specialized keyboard and mouse input via a generic device redirection channel from the client computer, the method including:

executing a device manager having respective interfaces to the generic device redirection channel and to a system queue of the hosting computer, the system queue being used to communicate keyboard and mouse input events to an operating system of the hosting computer, the system queue having a separate interface to a specialized virtual channel for receiving redirected keyboard and mouse input from standard keyboard and mouse devices connected to the client computer;

by the device manager, identifying keyboard and mouse functions of other devices connected to the client computer and having respective device input redirected to the hosting computer via the generic device redirection channel, and for the identified keyboard and mouse functions establishing respective device context engines for handling input events therefrom; and by the device context engines:
opening the respective keyboard and mouse functions of the respective other devices for receiving keyboard and mouse input events therefrom; and upon receiving input events from the respective keyboard and mouse functions, queueing the input events on the system queue to communicate the keyboard and mouse input events to the operating system.

18. The hosting computer of claim 17, wherein the operating system lacks native support for correctly processing keyboard/mouse input received directly from the generic device redirection channel without operation of the device manager.

19. The hosting computer of claim 17, wherein the hosting system includes a virtual machine executing the operating system as a guest operating system.

20. The hosting computer of claim 19, wherein the virtual machine provides a multi-user/multi-session platform interacting with multiple clients, with a requirement that the other devices of separate clients be logically isolated from each other.

* * * * *